(12) United States Patent
Shah et al.

(10) Patent No.: US 9,705,881 B2
(45) Date of Patent: Jul. 11, 2017

(54) IDENTITY POOL BRIDGING FOR MANAGED DIRECTORY SERVICES

(71) Applicant: Amazon Technologies, Inc., Reno, NV (US)

(72) Inventors: Shon Kiran Shah, Redmond, WA (US); Guruprakash Bangalore Rao, Bellevue, WA (US); Thomas Christopher Rizzo, Sammamish, WA (US); Gaurang Pankaj Mehta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 14/098,298

(22) Filed: Dec. 5, 2013

(65) Prior Publication Data

US 2015/0135272 A1 May 14, 2015

Related U.S. Application Data

(60) Provisional application No. 61/902,790, filed on Nov. 11, 2013.

(51) Int. Cl.
*H04L 29/06* (2006.01)
(52) U.S. Cl.
CPC .................. *H04L 63/10* (2013.01)
(58) Field of Classification Search
CPC ...................................... H04L 63/10
See application file for complete search history.

(56) References Cited

U.S. PATENT DOCUMENTS 6,055,637 A 4/2000 Hudson et al.
6,609,128 B1 8/2003 Underwood
(Continued)

FOREIGN PATENT DOCUMENTS

JP 2004355439 12/2004
JP 2005258672 9/2005
(Continued)

OTHER PUBLICATIONS

International Search Report and Written Opinion mailed Feb. 4, 2015, International Patent Application No. PCT/US2014/064894, filed Nov. 10, 2014, 14 pages.
(Continued)

*Primary Examiner* — Jeffrey Pwu
*Assistant Examiner* — William Corum, Jr.
(74) *Attorney, Agent, or Firm* — Davis Wright Tremaine LLP

(57) ABSTRACT

A customer of a computing resource service provider may utilize a set of credentials to request creation of an identity pool within a managed directory service. Accordingly, the managed directory service may create the identity pool. Instead of having the customer create a separate account within this identity pool, the managed directory service may create a shadow administrator account within the identity pool, which may be used to manage other users and resources in the identity pool within the managed directory service. The managed directory service further exposes an application programming interface command that may be used to obtain a set of credentials for accessing the shadow administrator account. The customer may use this command to receive the set of credentials and access the shadow administrator account. Accordingly, the customer can manage users and resources in the identity pool within the managed directory service.

20 Claims, 9 Drawing Sheets

(56) References Cited

U.S. PATENT DOCUMENTS

| | | |
|---|---|---|
| 7,574,202 B1 | 8/2009 | Tsao et al. |
| 8,224,994 B1 | 7/2012 | Schneider |
| 8,307,003 B1 | 11/2012 | Sheth et al. |
| 8,533,796 B1 | 9/2013 | Shenoy et al. |
| 8,656,471 B1 | 2/2014 | Allen et al. |
| 9,213,513 B2 | 12/2015 | Hartz et al. |
| 2002/0143943 A1* | 10/2002 | Lee et al. .................. 709/225 |
| 2004/0205152 A1 | 10/2004 | Yasuda et al. |
| 2005/0203993 A1 | 9/2005 | Grobman et al. |
| 2006/0059252 A1 | 3/2006 | Tatsubori et al. |
| 2007/0112877 A1 | 5/2007 | Harvey et al. |
| 2007/0143829 A1 | 6/2007 | Hinton et al. |
| 2008/0046593 A1 | 2/2008 | Ando et al. |
| 2008/0140618 A1 | 6/2008 | Kumar |
| 2009/0089625 A1* | 4/2009 | Kannappan et al. .......... 714/39 |
| 2009/0328178 A1* | 12/2009 | McDaniel et al. ............... 726/9 |
| 2010/0017889 A1 | 1/2010 | Newstadt et al. |
| 2010/0122248 A1 | 5/2010 | Robinson et al. |
| 2010/0142401 A1 | 6/2010 | Morris |
| 2010/0254375 A1 | 10/2010 | Feuerhahn et al. |
| 2011/0066668 A1 | 3/2011 | Guarraci |
| 2011/0099147 A1 | 4/2011 | McAlister et al. |
| 2011/0251992 A1 | 10/2011 | Bethlehem et al. |
| 2011/0314520 A1* | 12/2011 | Olszewski et al. .............. 726/4 |
| 2012/0011578 A1 | 1/2012 | Hinton et al. |
| 2012/0017271 A1 | 1/2012 | Smith et al. |
| 2012/0110055 A1 | 5/2012 | Van Biljon et al. |
| 2012/0198022 A1 | 8/2012 | Black et al. |
| 2012/0233314 A1 | 9/2012 | Jakobsson |
| 2012/0246738 A1 | 9/2012 | Shah et al. |
| 2012/0266168 A1 | 10/2012 | Spivak et al. |
| 2012/0281708 A1 | 11/2012 | Chauhan et al. |
| 2013/0007845 A1* | 1/2013 | Chang et al. .................. 726/4 |
| 2013/0042115 A1 | 2/2013 | Sweet et al. |
| 2013/0054639 A1 | 2/2013 | Sharma et al. |
| 2013/0066834 A1 | 3/2013 | McAlister et al. |
| 2013/0174216 A1 | 7/2013 | Simske et al. |
| 2013/0198340 A1 | 8/2013 | Ukkola et al. |
| 2013/0227140 A1* | 8/2013 | Hinton et al. ............... 709/225 |
| 2013/0254847 A1 | 9/2013 | Adams et al. |
| 2013/0283270 A1 | 10/2013 | Holland et al. |
| 2013/0283298 A1 | 10/2013 | Ali et al. |
| 2014/0040993 A1* | 2/2014 | Lorenzo et al. .................. 726/4 |
| 2014/0075501 A1* | 3/2014 | Srinivasan et al. ............... 726/1 |
| 2014/0250075 A1 | 9/2014 | Broido et al. |
| 2014/0282510 A1 | 9/2014 | Anderson et al. |
| 2014/0298398 A1 | 10/2014 | Neely |
| 2014/0365549 A1 | 12/2014 | Jenkins |
| 2015/0089061 A1 | 3/2015 | Li et al. |
| 2015/0237149 A1 | 8/2015 | MacInnis |

FOREIGN PATENT DOCUMENTS

| | | |
|---|---|---|
| JP | 2012032956 | 2/2012 |
| JP | 2012123459 | 6/2012 |
| WO | WO2011106716 | 9/2011 |

OTHER PUBLICATIONS

International Search Report and Written Opinion mailed Feb. 19, 2015, International Patent Application No. PCT/US2014/065084, filed Nov. 11, 2014, 15 pages.

International Search Report and Written Opinion mailed Feb. 11, 2015, International Patent Application No. PCT/US2014/065081, filed Nov. 11, 2014, 11 pages.

International Search Report and Written Opinion mailed Feb. 23, 2015, International Patent Application No. PCT/US2014/065088, filed Nov. 11, 2014, 13 pages.

Bucicoiu et al., "Secure Cloud Video Streaming Using Tokens," RoEduNet Conference 13th Edition: Networking in Education and Research Joint Event Renam 8th Conference, Jan. 2014, 6 pages.

Carrion et al., "A Generic Catalog and Repository Service for Virtual Machine Images," 2010, University of Valencia, retrieved from internet https://www.researchgate.net/profile/German_Molto/publication/233906883_A_Generic_Catalog_and_Repository_Service_for_Virtual_Machine_Images/links/0fcfd50cbb119a1184000000.pdf, 15 pages.

Lopez et al., "Providing secure mobile access to information servers with temporary certificates," 1999, retrieved from http://ac.els-cdn.com/S138912869900105X/1-s2.0-S138912869900105X-main.pdf?_tid=8d31c448-e679-11e6-b14f-00000aacb35f&acdnat=1485732221_f0f3684af0254bee6476a8321419cf32, 5 pages.

\* cited by examiner

IDENTITY POOL BRIDGING FOR MANAGED DIRECTORY SERVICES

CROSS REFERENCE TO RELATED APPLICATIONS

This application claims the benefit of U.S. Provisional Application No. 61/902,790, filed on Nov. 11, 2013, entitled "MANAGED DIRECTORY SERVICE," the content of which is incorporated by reference herein in its entirety.

BACKGROUND

Customers utilize directory services to create and maintain a directory (e.g., file systems, files, users, security policies, network resources, applications, system storage, etc.) for data management and, generally, access to a variety of resources. The directory service may be configured to create a directory in a data center operated by the customer (e.g., on-premises) or in a remote network (e.g., off-premises), dependent on the customer's business needs. However, a customer desiring to maintain a directory on-premises and off-premises may encounter numerous difficulties. For instance, a customer utilizing an on-premises directory may be required to create a separate directory off-premises and sync data between the two directories to maintain the same set of data. This may require the customer to maintain multiple accounts for each user of the directories. Further, maintenance of multiple directories may increase the administrative burden of the customer, as maintenance and security of the multiple directories may require additional resources to perform. Exacerbating the problem, the customer may be required to create a new identity pool within a directory service, separate from an identity pool used to create and manage users of services provided by the computing resource service provider.

BRIEF DESCRIPTION OF THE DRAWINGS

Various embodiments in accordance with the present disclosure will be described with reference to the drawings, in which.

DETAILED DESCRIPTION

Figure 1:
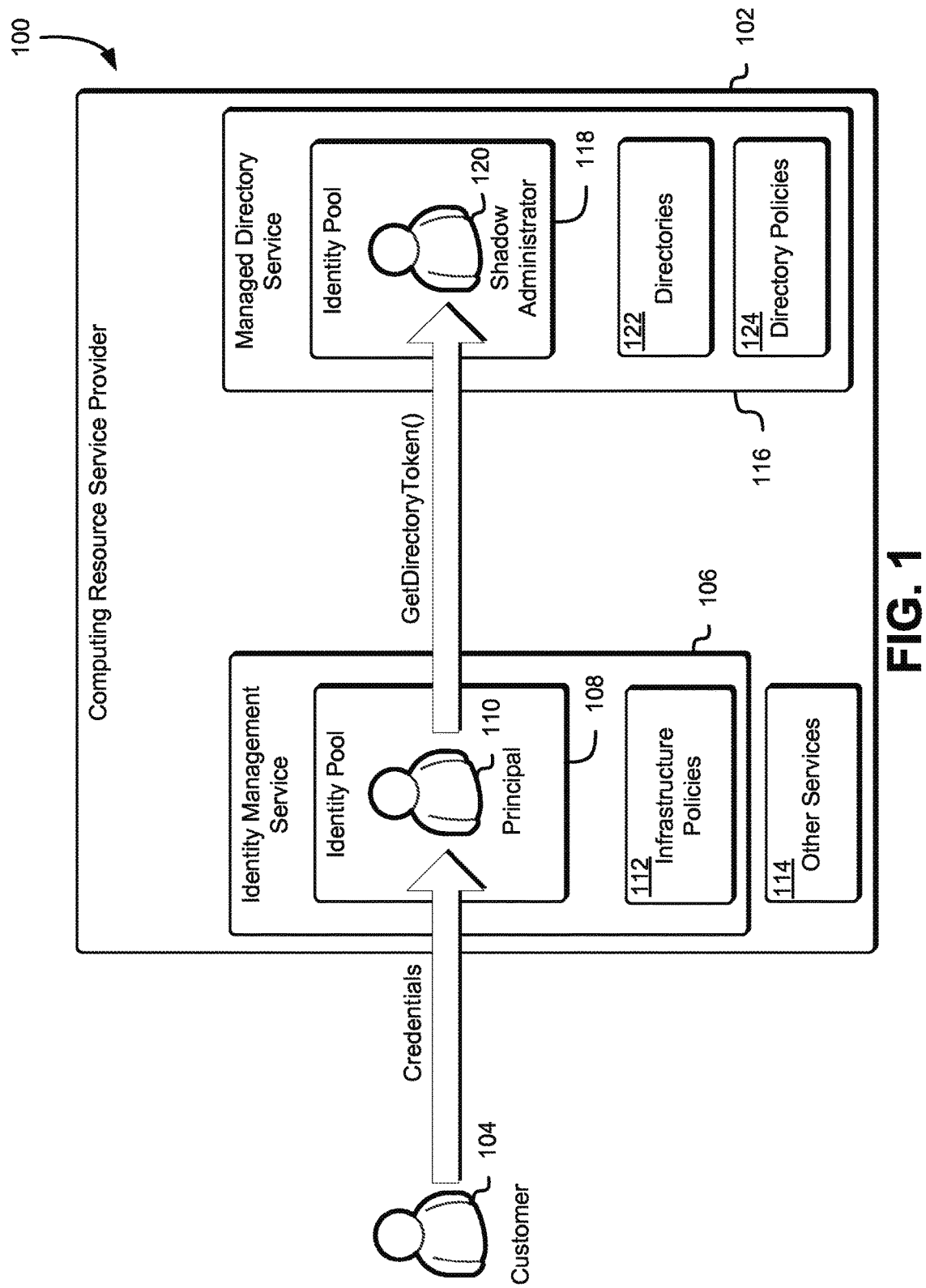
FIG. 1 is an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the identity pool bridging between a computing resource service provider and a managed directory service for the management of resources within the managed directory service. In an embodiment, an entity (e.g., an organization) communicates, through associated computing devices, with a managed directory service. The communications may be made in accordance with one or more protocols utilized by the managed directory service, such as through one or more appropriately configured application programming interface (API) calls to the service. In some examples, a communication to the managed directory service is to request creation of a new identity pool within the managed directory service for managing users and directories. The entity may be a customer of a computing resource service provider that operates various services such as a virtual computer system service, object-based data storage services, database services, the aforementioned managed directory service and a plurality of other services.

In various embodiments, the entity utilizes a set of credentials to access the computing resource service provider in order to communicate with the managed directory service and request creation of a new identity pool. For instance, the entity may utilize an electronic signature generated using a cryptographic key such that the electronic signature is verifiable by the computing resource service provider. In another instance, the entity may utilize a username and password that may be verified by the computing resource service provider. Accordingly, an identity management service provided by the computing resource service provider may utilize this set of credentials to identify the entity and determine a level of access to the one or more services provided by the computing resource service provider. Thus, if the entity has been granted access to the managed directory service, the entity may be permitted to generate a request to create this new identity pool. In an embodiment, the entity can use this newly created identity pool to manage resources, as well as users and their access to one or more directories and applications provided in the managed directory service.

In an embodiment, when the customer utilizes the managed directory service to create this new identity pool, the managed directory service creates a shadow administrator account within the identity pool. The shadow administrator account may be an account for a directory within the managed directory service that corresponds to a customer account within the computing resource service provider and any delegated user accounts the customer has enabled to access the shadow administrator account. This shadow administrator account may be used by the entity or any other delegated users as defined by the entity to manage resources in a directory, including but not limited to, the users of a directory within the managed directory service, groups of users of the directory, policies applicable to these users and groups and one or more applications managed through the directory. Accordingly, the managed directory service may be configured to expose a new appropriately configured API call that may allow the entity to obtain a set of credentials from the newly created identity pool that may be used to access the shadow administrator account.

In an embodiment, an identity management service operated by the computing resource service provider maintains a separate identity pool which is used to store the myriad users that utilize the one or more services provided by the computing resource service provider and manage their access to these services. Accordingly, the entity, which may also be part of this identity pool, may utilize the identity management service to identify which users are permitted to utilize the new appropriately configured API call exposed by the managed directory service to access this shadow administrator account. Thus, if a user accesses the computing resource service provider to utilize the appropriately configured API call to access the shadow administrator account within the identity pool, the identity management service may determine whether the user has the requisite permissions to utilize this API call. If the user does not have access, the identity management service may prevent the user from utilizing the API call to access the shadow administrator account within the newly created identity pool.

In this manner, an entity may be able to access the newly created identity pool within the managed directory service to manage one or more users and their access to directories, applications and resources within the managed directory service without being required to explicitly create a separate administrator account within the newly created identity pool. In addition, the techniques described and suggested herein facilitate additional technical advantages. For example, because the shadow administrator account within the identity pool is created automatically when the entity utilizes the managed directory service to request creation of the identity pool, the entity may be able to create users and enable one or more policies for defining a level of access to applications and directories within the managed directory service without initiating the appropriately configured API call to the service on the first instance.

FIG. 1 shows an illustrative example of an environment 100 in which various embodiments may be practiced. In the environment 100, a computing resource service provider 102 provides various computing resource services to customers of the computing resource service provider. The computing resource service provider 102 may be an organization that hosts various computing resources on behalf of one or more customers. For example, a computing resource service provider 102 may operate one or more facilities that are used to host various computing hardware resources, such as hardware servers, data storage devices, network devices, and other equipment, such as server racks, networking cables and the like. The computing resource service provider 102 may utilize its computing hardware resources to operate one or more services. Such services may include services that enable customers of the computing resource service provider 102 to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

Accordingly, as illustrated in FIG. 1, the environment 100 includes a customer 104. The customer 104 may be an individual, organization or automated process that could utilize one or more services provided by the computing resource service provider 102 to operate and manage one or more directories 122 to support his or her operations. In order to operate and manage these directories 122, for instance, the customer 104 may be required to communicate with a managed directory service 116 to create an identity pool 118 within the managed directory service 116. This identity pool 116 may be used to manage a variety of users and directories 122 within the managed directory service 116, as well as to define one or more directory policies 124 applicable to these users.

In order to create and manage the identity pool 118 within the managed directory service 116, the customer 104 may, through a customer computer system device, utilize a set of credentials to access the computing resource service provider 102 and the managed directory service 116. Accordingly, an identity management service 106, configured to verify the identity of users that request access to the computing resource service provider 102 and its associated services, may evaluate the credentials and determine whether the customer 104 is a principal 110 within an identity pool 108 managed by the identity management service 106. Additionally, the identity management service 106, upon identifying the principal 110, may determine what infrastructure policies 112 apply to this principal 110. For example, if an infrastructure policy has been defined that states that the principal 110 is not authorized to access the managed directory service 116, the identity management service 106 may deny any requests from the principal 110 to access the managed directory service 116. The infrastructure policies 112 may also be defined to be applicable for one or more other services 114 provided by the computing resource service provider 102.

As will be described in greater detail below, the customer 104 may utilize the set of credentials to access the computing resource service provider 102 and transmit a request, such as through one or more appropriately configured API calls, to the managed directory service 118 to create a new identity pool 118. As noted above, this new identity pool 118 may be used to manage resources, manage one or more users within the managed directory service 116 and define one or more directory policies 124 that may be applicable to these users. These directory policies 124 may be used to define a user's access to one or more directories 122 within the managed directory service 116 and any applications within these one or more directories 122. The managed directory service 116 may be configured to create a shadow administrator account 120 within this newly created identity pool 118 to enable a customer 104 to access the identity pool 118.

Accordingly, the managed directory service 116 may be configured to expose a new appropriately configured API call (e.g., "GetDirectoryToken( )" as illustrated in FIG. 1) that may be used by a customer 104, through the principal 110, to obtain a set of credentials that may be used to access the shadow administrator account 120. The customer 104, at any time, may request, such as through this appropriately configured API call to the service, this set of credentials to access the shadow administrator account 120 within the managed directory service 116. Additionally, the customer 104 may utilize the identity management service 106 to identify one or more delegated users, through creation of new infrastructure policies 112, which may be permitted to use this appropriately configured API call and, accordingly, the shadow administrator account 120. In an embodiment, the managed directory service 116 is configured to enable a customer 104 requesting creation of the new identity pool 118 to access the shadow administrator account 120 without requiring an additional set of credentials. This may enable the customer 104 to utilize the shadow administrator account 120 to manage resources in a directory 122, wherein the resources include users of the directory 122, groups of users of the directory 122, and directory policies 124 applicable to these users immediately.

Figure 2:
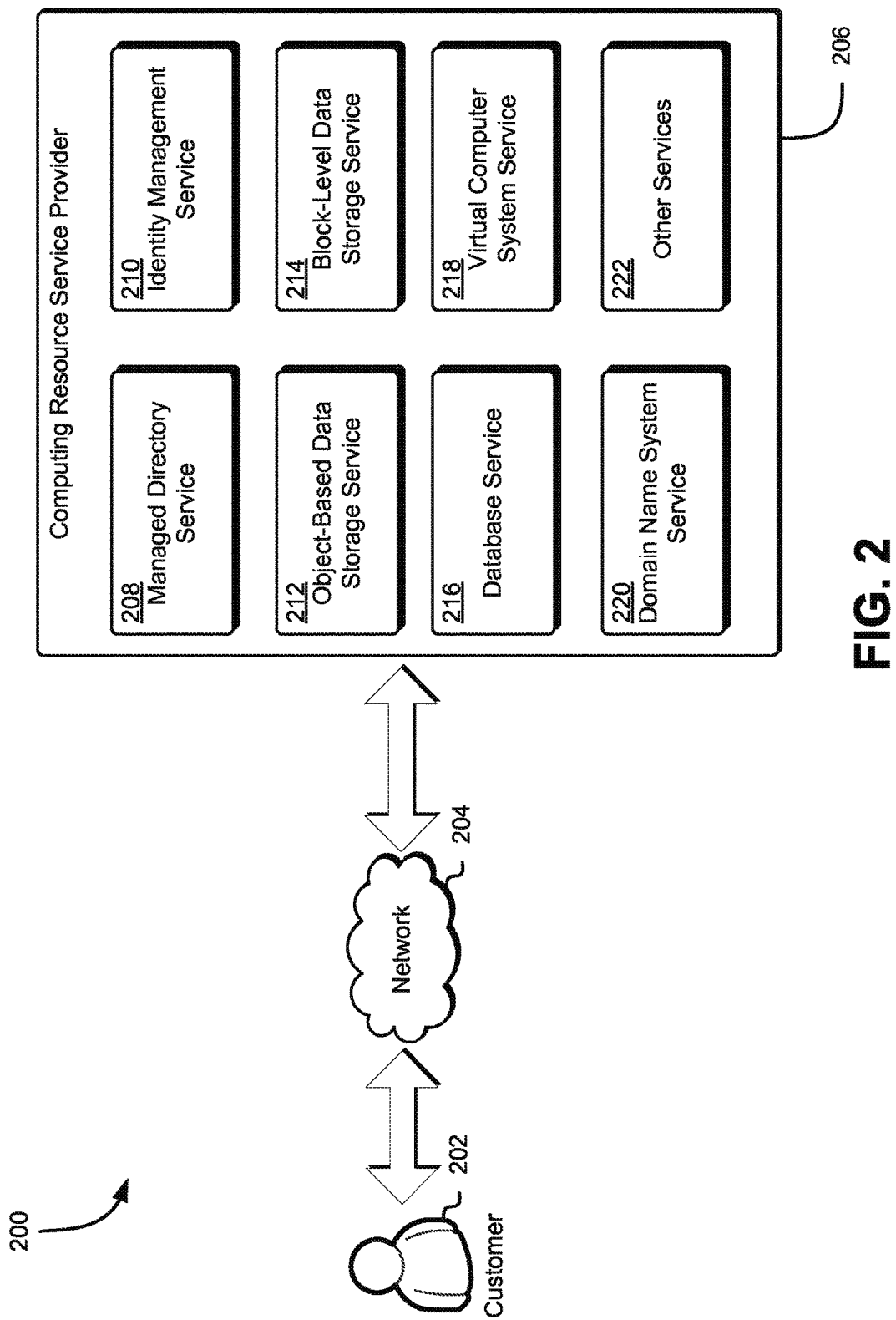
FIG. 2 is an illustrative example of an environment in which various embodiments can be implemented.

FIG. 2 shows an illustrated example of an environment 200 in which various embodiments of the present disclosure may be practiced. In the environment 200, a computing resource service provider 206 may provide a variety of services to a customer 202. The customer 202 may be an organization that may utilize the various services provided by the computing resource service provider 206 to remotely generate and maintain an identity pool to allow a variety of users to access one or more directories within a managed directory service 208. As illustrated in FIG. 2, the customer 202 may communicate with the computing resource service provider 206 through one or more communications networks 204, such as the Internet. Some communications from the customer 202 to the computing resource service provider 206 may cause the computing resource service provider 206 to operate in accordance with various techniques described herein or variations thereof.

As noted above, a computing resource service provider 206 may provide various computing resource services to its customers. For instance, in this particular illustrative example, the computing resource service provider 206 provides at least seven types of services. The services provided by the computing resource service provider, in this example, include a managed directory service 208, an identity management service 210, an object-based data storage service 212, a block-level data storage service 214, a database service 216, a virtual computer system service 218, a domain name system service 220 and one or more other services 222, although not all embodiments of the present disclosure will include all such services and additional services may be provided in addition to or as an alternative to services explicitly described herein.

The managed directory service 208 may provide a variety of services to enable computer systems and/or computer system client devices to access customer directories including, but not limited to, authentication, authorization and directory services. For example, the managed directory service 208 may provide authentication services which may authenticate credentials of a user, computer system, process, automated process or other such entity to at least determine whether that entity is authorized to access the managed directory service 208 and/or the customer directories associated with the managed directory service 208. In some embodiments, the credentials may be authenticated by the managed directory service 208 itself, or they may be authenticated by a process, program or service under the control of the managed directory service 208, or they may be authenticated by a process, program or service that the managed directory service 208 may communicate with or they may be authenticated by a combination of these and/or other such services or entities.

The managed directory service 208 may also provide authorization services which may authorize a user, computer system, process, automated process or other such entity to at least determine which actions of one or more possible actions that entity may perform. Examples of actions that an entity may or may not be authorized to perform include, but are not limited to, creating resources on the customer directory, destroying resources on the customer directory, attaching to resources on the customer directory, detaching from resources on the customer directory, providing access links to resources on the customer directory, reclaiming access links to resources on the customer directory, allowing reads from resources on the customer directory, allowing writes to resources on the customer directory and/or other such actions.

The managed directory service 208 may also provide directory services which may provide an authenticated entity access to the customer directories according to the authorization credentials and/or policies. For example, in an embodiment where a computer system entity may be authorized to read and write a certain data store on a customer directory, the ability to do so may be provided by the directory services. Directory services may provide access to customer directories by providing links to the customer directory locations such as by a uniform resource identifier (URI) object or some other such linkage. As may be contemplated, the URI may be provided by the computer system client device, or by a process running at the data center, or by a process running on a computer system connected to the datacenter, or by the managed directory service or by a combination of these and/or other such computer system entities.

As noted above, a customer may utilize the managed directory service 208 to create and manage an identity pool which may be used to store a variety of users that may utilize the managed directory service 208 to access one or more directories. Additionally, the customer may utilize this identity pool to further manage each user's access to these one or more directories. Upon creation of the identity pool, the managed directory service may create a shadow administrator account within the identity pool and enable a customer to utilize a new appropriately configured API call that may be used by the customer to obtain a set of credentials to access this shadow administrator account. The shadow administrator account may be used to further manage one or more user profiles in order to define each user's level of access to a directory, as well as applications within the directory.

The identity management service 210 may provide a variety of services to enable customers to define a level of access to other services, such as those illustrated in FIG. 2, provided by the computing resource service provider 206. Accordingly, a customer 202 may access the identity management service 210 to create and manage one or more users and groups that may utilize the services provided by the computing resource service provider 206. A customer 202 may utilize the identity management service 210 to define a set of infrastructure policies for each user and/or group to allow and/or deny their permissions to access the services provided by the computing resource service provider 206.

As noted above, a customer 202 may utilize a set of credentials to access the computing resource service provider 206. The identity management service 210 may be configured to verify the identity of the customer 202 and allow the customer 202 to operate as a principal in an identity pool within the identity management service 210. Accordingly, the customer 202 may be able to access the managed directory service 208 and request creation of a new identity pool. As will be described in greater detail below, once the newly created identity pool within the managed directory service 208 is available, the customer 202 may utilize the identity management service 210 to identify one or more users of the computing resource service provider 206 that may be permitted to utilize a new appropriately configured API call provided by the managed directory service 208 to access the shadow administrator account.

The object-based data storage service 212 may comprise a collection of computing resources that collectively operate to store data for a customer 202. The data stored in the object-based data storage service 212 may be organized into data objects. The data objects may have arbitrary sizes except, perhaps, for certain constraints on size. Thus, the object-based data storage service 212 may store numerous data objects of varying sizes. The object-based data storage service 212 may operate as a key value store that associates data objects with identifiers of the data objects which may be used by the customer to retrieve or perform other operations in connection with the data objects stored by the data storage service 212. Access to the data storage service may be through appropriately configured API calls.

The block-level data storage service 214 may comprise a collection of computing resources that collectively operate to store data for a customer. For instance, the block-level data storage system may be configured to provide block-level data storage volumes for use with a virtual machine instance. A customer 202 may interact with the block-level data storage service 214 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The database service 216 may be a collection of computing resources that collectively operate to run one or more databases for one or more customers. Customers 202 of the computing resource service provider 206 may operate and manage a database from the database service 216 by utilizing appropriately configured API calls. This, in turn, may allow a customer 202 to maintain and potentially scale the operations in the database.

The virtual computer system service 218 may be a collection of computing resources configured to instantiate virtual machine instances onto virtual computing systems on behalf of the customers 202 of the computing resource service provider 206. Customers 202 of the computing resource service provider 206 may interact with the virtual computer systems service 218 to provision and operate virtual computer systems that are instantiated on physical computing devices hosted and operated by the computing resource service provider. The virtual computer systems may be used for various purposes, such as to operate as servers supporting a website. Other applications for the virtual computer systems may be to support database applications, electronic commerce applications, business applications and/or other applications.

The Domain Name System (DNS) service 220 may be designed to give customers 202 a method to route end users to one or more communications network applications. For instance, the DNS service 220 may be configured to translate human-readable names, such as uniform resource locators (URLs), into numeric Internet Protocol (IP) addresses that computer systems may use to connect to each other over the Internet. Thus, the DNS service 220 may be configured to connect requests to access one or more services provided by the computing resource service provider 206 to the infrastructure that is operating within a data zone. The DNS service 220 may additionally be configured to route customers 202 of the computing resource service provider 206 to infrastructure outside of the data zone, such as another computing system operated by a separate provider.

The computing resource service provider 206 may additionally maintain one or more other services 222 based on the needs of its customers 202. For instance, the computing resource service provider 206 may maintain an account service which may comprise a collection of computing resources that collectively operate to maintain customer account information for each customer 202 of the computing resource service provider 206. The account service may include, for example, the customer name, address, phone numbers, billing details and other personal identification information for each customer of the computing resource service provider. Other services include, but are not limited to, load balancing services and services that manage other services and/or other services.

Figure 3:
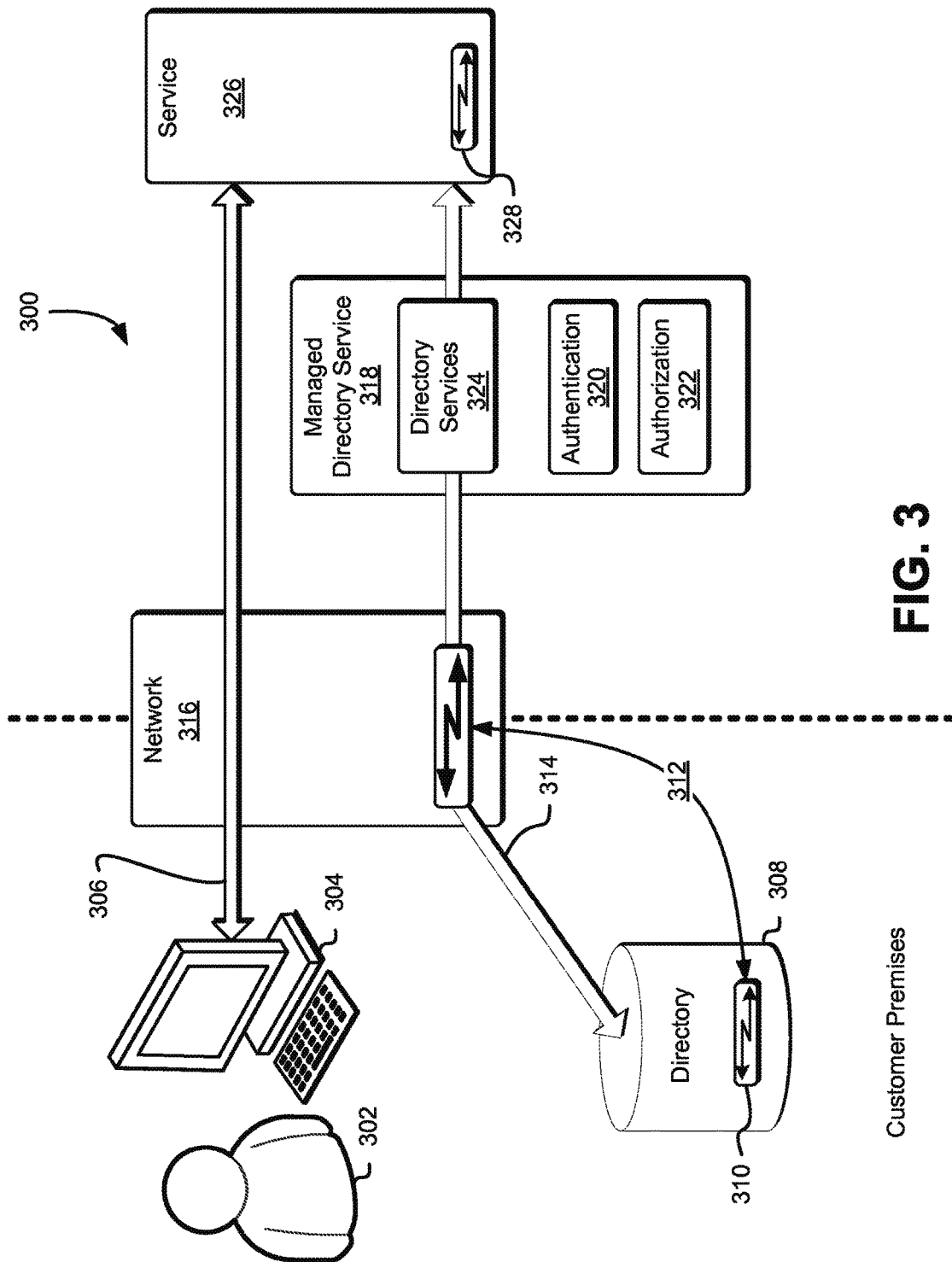
FIG. 3 is an illustrative example of an environment where computer system resources may be accessed by computer system entities in accordance with at least one embodiment.

As noted above, the customer of a computing resource service provider may utilize a managed directory service to request creation of an identity pool within the managed directory service to manage one or more users and their access to directories within the managed directory service and to applications within these directories. Accordingly, FIG. 3 illustrates an environment 300 for accessing computer system directory resources including, but not limited to, computer system services such as directory services and resources such as user resources, policy resources, network resources and/or storage resources associated with the directory services, on distributed and/or virtualized computer system environments as well as the associated code running thereon in accordance with at least one embodiment. A computer system entity, user or process 302 may connect to a computer system through a computer system client device 304 and may request access via connection 306 to one or more services 326. The command or commands to request access to a service may originate from an outside computer system and/or server, or may originate from an entity, user or process on a remote network location, or may originate from the computer system, or may originate from a user of the computer system client device, or may originate as a result of a combination of these and/or other such objects. The command or commands to request access to a service may, in some embodiments, be issued by a privileged user, or by an unprivileged user, or by an autonomous process, or as a result of an alarm or condition or by a combination of these and/or other methods.

The computer system client device may request access to services via one or more networks 316 and/or entities associated therewith, such as other servers connected to the network, either directly or indirectly. The computer system client device may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

In some embodiments, the computer system may include one or more local computer system resources 308 which may be located at least in part on the customer premises and which may store files and/or other computer system resources thereon including, but not limited to, directories, applications, data, databases, links to other computer system resources, system drivers, computer operating systems, virtual machines and/or other such resources. In some embodiments, the local computer system resources may be local file system resources and may be stored on a variety of storage devices such as system random access memory (RAM), disk drives, solid state drives, removable drives or combinations of these and/or other such storage devices. In some embodiments, the local computer system resources may be located at least in part in a datacenter (a plurality of computer system resources, services and/or storage devices that may be collocated) that may be accessed by the computer system client device via one or more connections such as, for example, the network connections described herein. The computer system resources and/or the datacenter may be located locally or a combination of locally and remotely. For example, in some embodiments, a file system and/or directory may be located on a disk located in a local datacenter and the contents of the file system and/or directory may also be replicated to a disk located in a remote datacenter. In some other embodiments, a file system and/or directory may have at least a part of its contents located in one datacenter that may be local, and other parts of its contents located in one or more other datacenters that may be local or remote. The storage devices may include physical devices such as those described herein and/or virtual representations of such physical devices. For example, a file system and/or directory storage device may include some amount of physical memory, part of which is dedicated to storage as a virtual disk drive with a file system created on the virtual disk drive. Other such local storage devices may be considered as within the scope of this disclosure.

In some embodiments, the service 326 may need access to one or more computer system directory resources such as those described herein. The service 326 may, in some embodiments, include a variety of other computer system entities including, but not limited to, users, other computer systems, processes and/or automated processes and/or other such computer system entities. Access 314 to the system directory resources may, in some embodiments, be provided by a service such as a managed directory service 318, which may provide access to one or more system resources. The managed directory service may provide a variety of services to enable computer systems and/or computer system client devices to access system resources including, but not limited to, 320 authentication, 322 authorization and 324 directory services.

For example, the managed directory service may provide 320 authentication services which may authenticate credentials of a user, computer system, process, automated process or other such entity to at least determine whether that entity is authorized to access the managed directory service and/or the system resources associated with the managed directory service. In some embodiments, the credentials may be authenticated by the managed directory service itself, or they may be authenticated by a process, program or service under the control of the managed directory service, or they may be authenticated by a process, program or service that the managed directory service may communicate with, or they may be authenticated by, a combination of these and/or other such services or entities.

The managed directory service may also provide 322 authorization services which may authorize a user, computer system, process, automated process or other such entity to at least determine which actions of one or more possible actions that entity may perform. For example, in the case of a computer system resource such as a file system resource, actions that an entity may or may not be authorized to perform include, but are not limited to, creating file systems on the file system resource, destroying file systems on the file system resource, attaching to file systems on the file system resource, detaching from file systems on the file system resource, providing access links to file systems on the file system resource, reclaiming access links to file systems on the file system resource, allowing reads from file systems on the file system resource, allowing writes to file systems on the file system resource and/or other such file system resource actions.

Actions on system resources may include, but not be limited to, actions on directories, files, applications, data, databases, links to other resources, system drivers, operating systems, virtual machines and/or other such system resource objects thereon and may include such actions as the actions mentioned herein. Actions to start, stop, reclaim, destroy and/or otherwise manage the system resources as well as other such actions may also be included in the available actions. Authorization to perform actions may be managed by an entity such as a credentialing or policy system such as a system that, for example, maintains a set of credentials and/or policies related to a certain entity and may determine, based at least in part on the set of credentials and/or policies which actions an entity is authorized to perform. The actions that an entity may be authorized to perform may be static or may vary according to a number of factors including, but not limited to, time of day, type of credentials, system policies, nature, type or location of the object being accessed or a combination of these and/or other such authorization factors. For example, a computer system entity may be authorized only to read certain files on a file system, to read and write certain other files on a file system, and to add and delete certain other files on a file system. A different computer system entity may be authorized to perform any actions on the file system, but only if those actions are initiated from a certain location and at a certain time. One or more processes may be authorized only to write to a file on a file system, such as, for example, a system log, while other processes may only be authorized to read from the file. As may be contemplated, these are illustrative examples. Other types of operations may be authorized by the managed directory service authorization system and such other types of operations are also considered as being within the scope of the present disclosure.

The managed directory service may also provide 324 directory services which may provide an authenticated entity access 314 to computer system resources according to the authorization credentials and/or policies. For example, in an embodiment where a computer system entity may be authorized to read and write a certain data store on a computer system resource such as a file system resource, the ability to do so may be provided by the directory services. Directory services may provide access to the file system resource by providing links to the file system resource locations such as by a URI object or some other such linkage. The URI may be provided by the computer system client device, or by a process running at the data center, or by a process running on a computer system connected to the datacenter, or by the managed directory service or by a combination of these and/or other such computer system entities.

In some embodiments, the access to the computer system resources may be provided in such a way that the access is invisible to the requesting entity. For example, the access 314 may be provided to a requesting entity as a URI or other such link to a location 310 on the local file system 308. The location on the computer system resource may be 312 translated into a URI by one or more processes running on the computer system. The service or entity 326 that requested the access to the computer system resource may use the 328 received URI to access the computer system resource without requiring configuration that is dependent on the location of the computer system resource and may, in some embodiments, use the URI to link to the computer system resource to operate as if the service or entity 326 were directly connected to the computer system resource. Operations that, for example, appear to write a set of data to a file that may appear to the service or entity to be located in a location local to the service or entity, may actually package the data into a network packet and may then transfer the packet over the network 316 via the access link 314, to be actually written to a file located on local file system 308. As may be contemplated, these are illustrative examples and other types of operations which may be performed by the managed directory service may also be considered as within the scope of the present disclosure.

Figure 4:
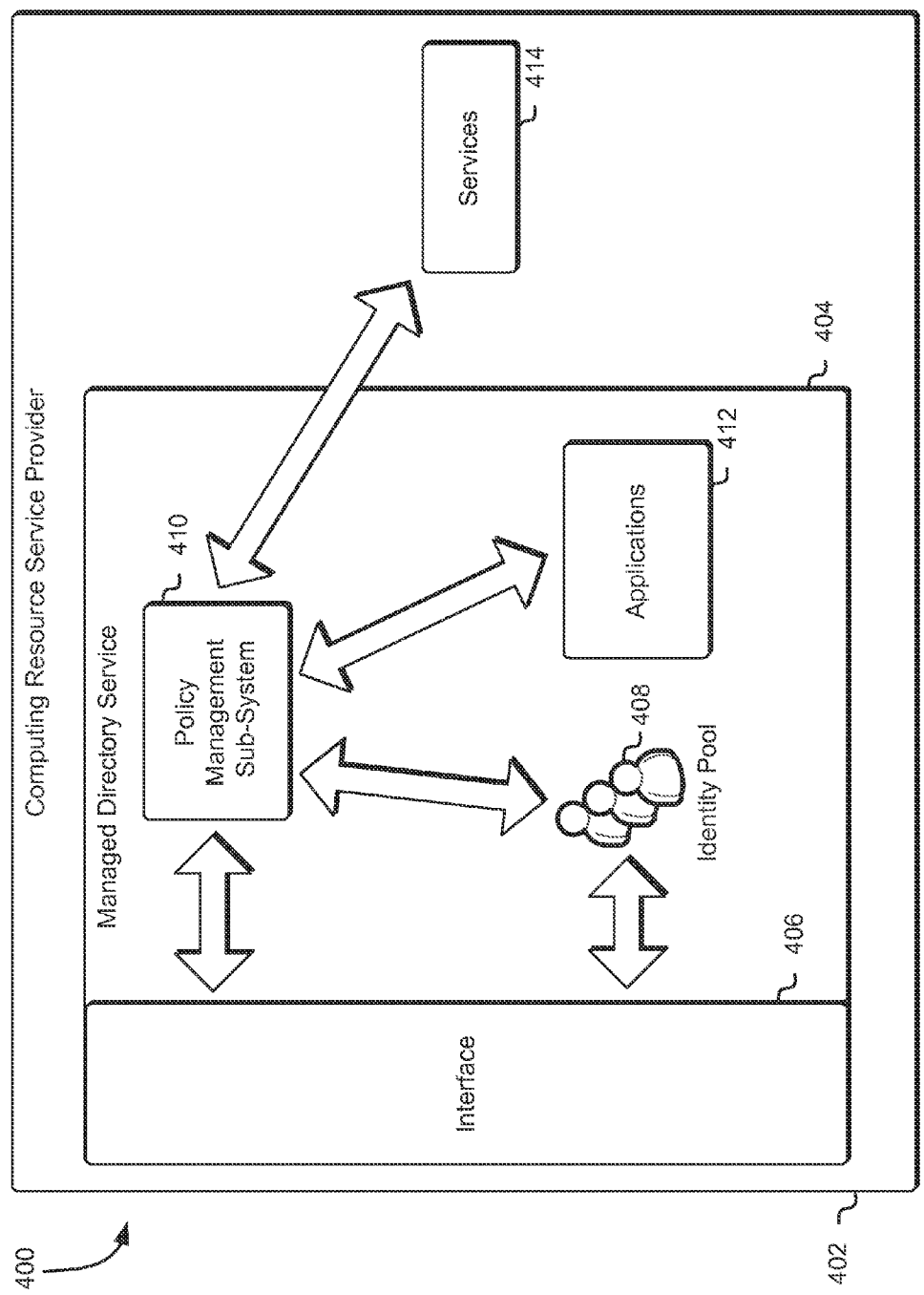
FIG. 4 is an illustrative example of the one or more components that comprise a managed directory service in accordance with at least one embodiment.

As noted above, a customer may use a set of credentials to access the computing resource service provider and a managed directory service in order to create an identity pool within the managed directory service to manage one or more users and their access to a variety of directories and applications within the managed directory service. Accordingly, FIG. 4 shows an illustrative example of an environment 400 that includes various components of a managed directory service 404 provided by a computing resource service provider 402 in accordance with at least one embodiment. The managed directory service 404 may provide customers and users who have been granted appropriate permissions through the identity management service with an interface 406 that may enable the customer or a delegated user to access the managed directory service 404. A customer or a delegated user may utilize the interface 406 through one or more communications networks, such as the Internet. The interface 406 may comprise certain security safeguards to ensure that the customer or delegated user has authorization to access the managed directory service 404. For instance, in order to access the managed directory service 404, a customer may need to provide a username and a corresponding password or encryption key when using the interface 406. Additionally, requests (e.g., API calls) submitted to the interface 406 may require an electronic signature generated using a cryptographic key such that the electronic signature is verifiable by the managed directory service 404, such as by an authorization system (not shown).

Through the interface 406, the customer or delegated user may be able to view the directory structure, including a listing of all available computers within the directory and the users authorized to access the directory. Accordingly, the customer or delegated user may use the interface 406 to access an identity pool 408 to create and manage one or more users and view user properties (e.g., first name and last name, location, phone number, etc.) and define one or more directory policies that may be used to determine a level of access to one or more services 414 provided by the computing resource service provider 402. Additionally, the customer or delegated user may access the identity pool 408 to further manage each user's access to one or more directories or applications 412 affected by one or more directories managed by the managed directory service 404. For instance, a customer or delegated user may access the identity pool 408 to access a policy generator within a user profile to define one or more policies for defining the user's level of access to the services 414 provided by the computing resource service provider 402. Accordingly, once the customer or delegated user has defined the applicable user policies through the policy generator, the customer or delegated user may be able to view the applied policies within the user profile. In addition, the policy generator may transmit one or more executable instructions to a policy management sub-system 410 which may cause the policy management sub-system 410 to generate a URI for a user-specific computing resource service provider interface. This computing resource service provider interface may enable a user to access the one or more services 414 provided by the computing resource service provider 402 from within the directory.

In an embodiment, a customer or delegated user may utilize a first set of credentials to access the computing resource service provider 402 in order to access the managed directory service 404 and request creation of a new identity pool 408. The customer or delegated user may be a principal within an identity pool in an identity management service with permissions to access the managed directory service 404. Accordingly, the customer or delegated user may utilize a computing resource service provider 402 interface to request creation of an identity pool 408 within the managed directory service 404. The managed directory service 404, in response to the request, may create the identity pool 408 based at least in part on the request and create, within the identity pool 408, a shadow administrator account which the customer or delegated user may use to manage resources in a directory (e.g., users within the directory, policies for accessing applications 412 and other directories within the managed directory service 404, as well as other services 414 provided by the computing resource service provider 402).

The managed directory service 404 may be configured to expose an appropriately configured API call (e.g., "GetDirectoryToken( )") to the computing resource service provider 402 to enable a customer or delegated user to obtain a set of credentials for accessing the shadow administrator account. Accordingly, the customer or delegated user may utilize this API call within the computing resource service provider 402 interface to obtain a set of credentials to access the managed directory service 404 as the shadow administrator. Thus, the customer or delegated user may access the managed directory service 404 interface 406 and utilize the set of credentials to access the directories and applications 412 within the managed directory service 404 and the identity pool 408 to manage other users' access to these directories and applications 412, as well as other services 414 provided by the computing resource service provider 402.

Figure 5:
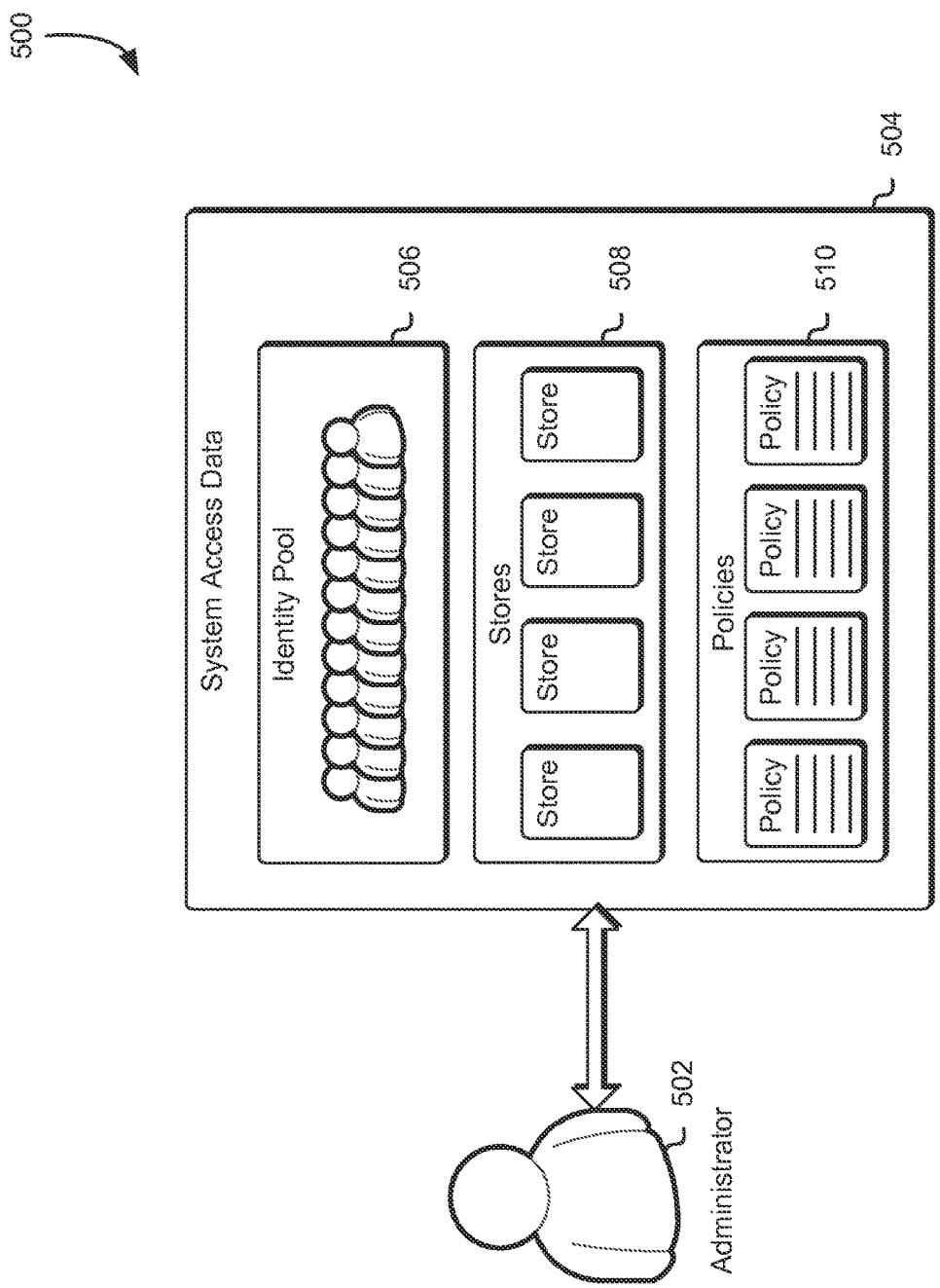
FIG. 5 is an illustrative example of an environment for maintaining a central location identity pool, stores and system policies used for authentication and authorization credentials in accordance with at least one embodiment.

FIG. 5 illustrates an example environment 500 for maintaining a central location identity pool, stores and system policies used for authentication and authorization credentials as described herein in accordance with at least one embodiment. An administrator 502 may maintain a set of system access data 504 which may, in some embodiments, be located in one or more local storage locations that may be located on the customer premises, or may, in some embodiments, be located in one or more remote storage locations that may be located in computer services resources or may, in some embodiments, be located in a storage location that may be located in a combination of local and remote storage locations. In some embodiments, the system access data may contain an identity pool 506 which may comprise one or more user profiles that include user names, user passwords, user biographical data and/or other such user profile information. The identity pool 506 may be used by one or more systems to provide authentication services such as the authentication services described herein in accordance with at least one embodiment. In some embodiments, the system access data 504 may comprise one or more stores 508 which may include references to one or more computer system resources. In some embodiments, the system access data 504 may comprise one or more polices 510 which may include one or more policy statements allowing, disallowing and/or limiting access to system resources such as, for example, system services, file systems, directories, machines, virtual machines, applications, documents and/or other such system resources. The policy statements may allow, disallow and/or limit access to system resources based on such factors as the contents of one or more user profiles, the user profile type, the requesting service, the requesting service type, the requesting service location, the time of day, the business value of the user, client, customer, request and/or other such business values or a combination of these and/or other such factors.

Figure 6:
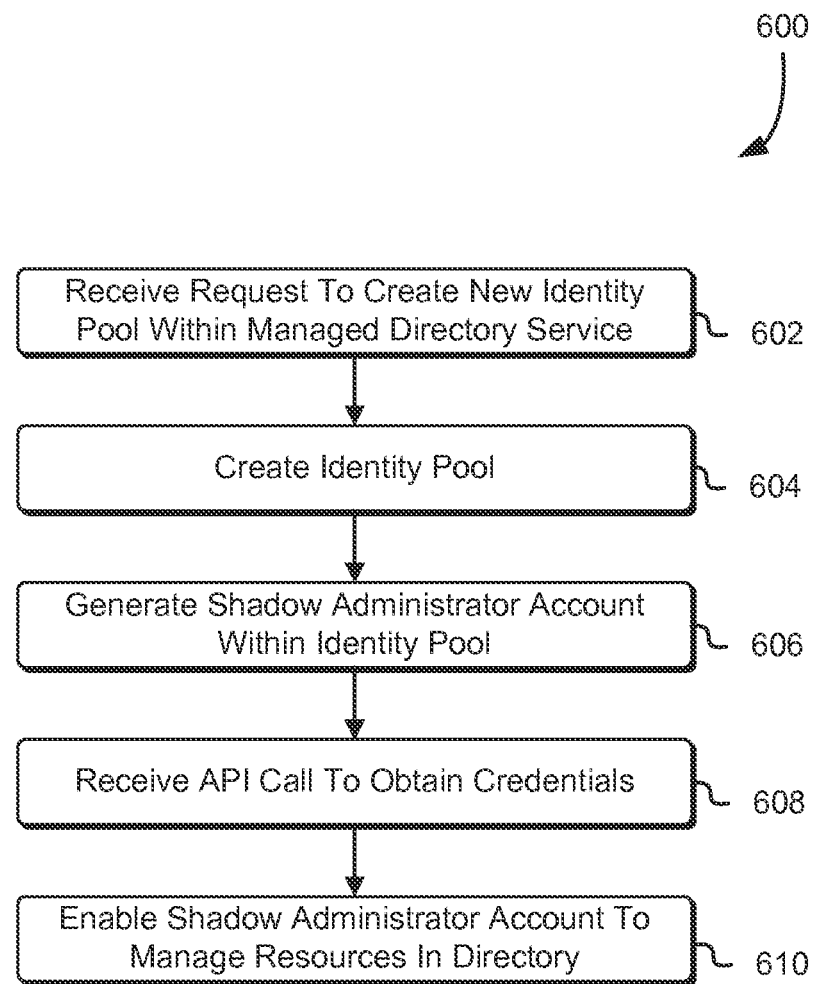
FIG. 6 is an illustrative example of a process for creating a shadow administrator account within a managed directory service in accordance with at least one embodiment.

As noted above, the creation of a new identity pool within a managed directory service may cause the managed directory service to create a shadow administrator account within this new identity pool to enable a customer or delegated user to access the managed directory service and manage a variety of resources in a directory, such as users or groups of users and their access to directories and applications within the directory. Accordingly, FIG. 6 is an illustrative example of a process 600 for creating a shadow administrator account within a managed directory service in accordance with at least one embodiment. The process 600 may be performed by a managed directory service operated by a computing resource service provider and configured to enable administrators and other delegated users to manage one or more directories and applications within the managed directory service, as well as manage one or more users and their access to these directories and applications.

As noted above, a customer or other delegated user (e.g., a user granted permissions to act on the customer's behalf) may utilize a set of credentials to access the computing resource service provider and the managed directory service. Accordingly, an identity management service, configured to verify the identity of users that request access to the computing resource service provider and its associated services, may evaluate the credentials and determine whether the customer is a principal within an identity pool managed by the identity management service. Additionally, the identity management service, upon identifying the principal, may determine what infrastructure policies apply to this principal. If the principal has the requisite permissions, according to the applicable policies, the principal may be able to transmit a request to the managed directory service to create a new identity pool. Accordingly, the managed directory service may receive 602 this request to create a new identity pool within the managed directory service.

In response to receiving the request from the principal to create a new identity pool, the managed directory service may be configured to create 604 this new identity pool. As noted above, this identity pool may enable an administrator of one or more directories and applications within the managed directory service to manage the myriad users that may utilize these directories and applications. Accordingly, as illustrated in FIGS. 4 and 5, an administrator may utilize an interface provided by the managed directory service to access the identity pool and manage one or more user profiles. Each of these user profiles may include a set of directory policies that are used to define a level of access to directories and applications within the managed directory service, as well as other services provided by the computing resource service provider.

In order to access the managed directory service and this newly created identity pool as an administrator, the customer or delegated user may be required to create a separate account within the managed directory service. Alternatively, the managed directory service may be configured to generate 606 a shadow administrator account within the newly created identity pool, which the customer or delegated user may utilize to access the managed directory service. This shadow administrator account may be configured to permit the user of the account to manage one or more users within the identity pool, as well as the applications and other resources available through the directory. For instance, as described above, an administrator may access a user profile within the identity pool to generate one or more directory policies to define a level of access to directories and applications within the managed directory service, as well as other services provided by the computing resource service provider. Additionally, the administrator may be able to manage the directories and applications within the managed directory service based on a customer's business needs.

Once the shadow administrator account has been generated within the identity pool, the managed directory service may receive 608 an appropriately configured API call from the customer or other delegated user that may be used to obtain a set of credentials that may be used to access the shadow administrator account. As noted above, the managed directory service may be configured to expose an appropriately configured API call (e.g., "GetDirectoryToken( )") to the computing resource service provider that may enable a customer or delegated user to obtain a set of credentials for accessing the shadow administrator account. Accordingly, the customer or delegated user may access the computing resource service provider and transmit this appropriately configured API call to the managed directory service to obtain the set of credentials which can be used to access the shadow administrator account. As will be described below in connection with FIG. 8, the customer may utilize the identity management service to manage infrastructure policies applicable to one or more delegated users and determine which delegated users may utilize this newly exposed API call. Additionally, in an alternative embodiment, upon creation of this new identity pool and generation of the shadow administrator account, the managed directory service enables the customer or delegated user to access the shadow administrator account without having to use the API call during this initial instance. However, for subsequent access to the shadow administrator account, the customer or delegated user may be required to transmit this API call to the managed directory service to obtain the set of credentials necessary to access the shadow administrator account.

As noted above, the customer or delegated user may use the obtained set of credentials to access the managed directory service identity pool as a shadow administrator. Accordingly, the managed directory service may be configured to enable 610 the shadow administrator account to manage one or more resources within a directory, including other users and/or applications within the directory. In an embodiment, the managed directory service is configured to define one or more policies for the shadow administrator account that, when applied to the shadow administrator account, grants the shadow administrator account the requisite permissions to manage the one or more resources within a directory, including other users and/or applications within the directory. Accordingly, when a customer or delegated user utilizes the set of credentials to access this shadow administrator account, the customer or delegated user may be able to properly manage the other users and/or applications within the directory.

Figure 7:
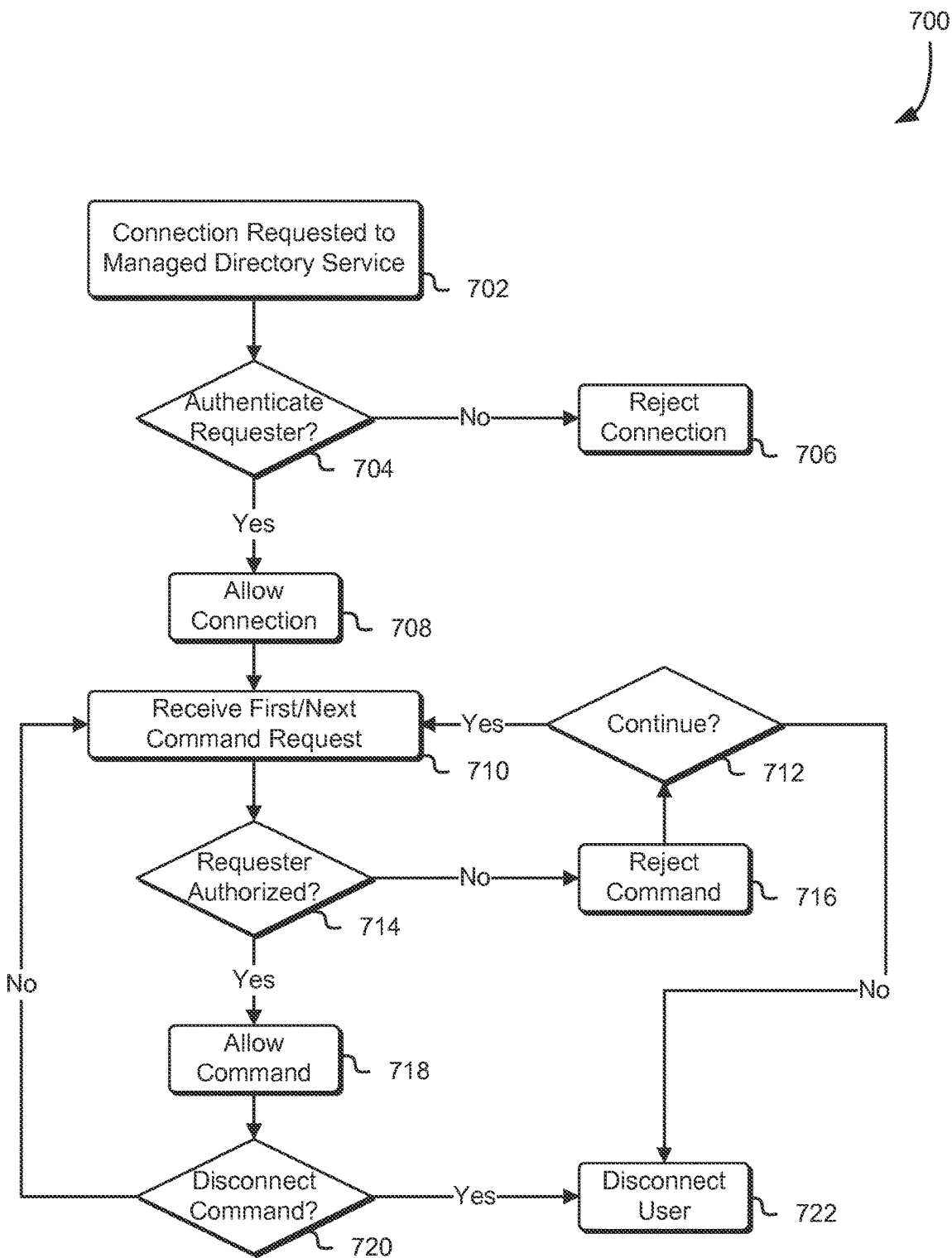
FIG. 7 is an illustrative example of a process for authenticating access to a managed directory service in accordance with at least one embodiment.

As noted above, a customer may utilize an appropriately configured API call to a managed directory service to obtain a set of credentials that may be used to access a shadow administrator account within a newly created identity pool within the managed directory service. Accordingly, FIG. 7 illustrates an example process 700 for authenticating access to a managed directory service and for authorizing an entity that is authenticated to perform one or more commands associated with the managed directory service, as described herein at least in connection with FIG. 4 and in accordance with at least one embodiment. A service such as the managed directory service 404 as described in FIG. 4, or a process associated with a managed directory service may perform the actions illustrated in process 700.

A managed directory service may receive a request 702 to allow the requester to access the managed directory service and one or more of the commands, directories and/or services provided by the managed directory service. In some embodiments, the requester may be a computer system entity, user or process such as the computer system entity, user or process described herein at least in accordance with at least one embodiment. In some embodiments, the request may originate from an outside computer system and/or server, or may originate from an entity, user or process on a remote network location, or may originate from a local computer system, or may originate from a user of a computer system client device, or may originate as a result of a combination of these and/or other such conditions. The command or commands to issue the request may, in some embodiments, be issued by a privileged user, or by an unprivileged user, or by an autonomous process, or as a result of an alarm or condition or by a combination of these and/or other methods.

The managed directory service may first 704 authenticate the user using processes such as the processes described herein at least in connection with FIG. 4 and in accordance with at least one embodiment. The managed directory service may, in some embodiments, use system access data such as the user profile data within an identity pool described herein at least in connection with FIG. 5 and in accordance with at least one embodiment. If the requester is 704 authenticated, the managed directory service may 708 allow the connection and 710 begin receiving commands from the requester. If the requester is 704 not authenticated, the managed directory service may 706 reject the connection.

Once the managed directory service 710 begins receiving commands from the requester, the managed directory service may 714 determine whether the requester is authorized to perform each command. The managed directory service may authorize the requester to perform each command using authorization processes in accordance with at least one embodiment. The managed directory service may, in some embodiments, use system access data such as the user profile and/or policy data described herein at least in connection with FIG. 5 and in accordance with at least one embodiment.

If the requester is 714 not authorized to perform the received command, the managed directory service may 716 reject the particular command and may then determine whether it should 712 continue processing commands from the requester. Accordingly, some rejected commands may result in not performing the command, some rejected commands may result in alerting the requester and/or other computer system entities that the command has been rejected, some rejected commands may result in terminating the connection to the requester and some rejected commands may result in a combination of these and/or other such actions. If the managed directory service does elect to 712 continue receiving commands from the requester, the managed directory service may 710 wait for the next command. If the managed directory service does not elect to 712 continue, the managed directory service may 722 disconnect the requester. As may be contemplated, 722 disconnecting the requester may include disconnecting the requester, notifying the requester of the disconnection, notifying one or more other computer system entities of the disconnection or a combination of these and/or other such disconnection actions.

If the requester is 714 authorized to perform the received command, the managed directory service may 718 allow the command which may include performing the command, alerting the requester that the command is allowed, alerting one or more other system entities that the command is allowed, requesting one or more other system entities to perform the command or a combination of these and/or other such responses. As may be contemplated, the received command and/or a response to the 718 allow command may include at least in part a 720 request to disconnect which may cause the managed directory service to 722 disconnect the requester. If the managed directory does not receive a 720 disconnect command, the managed directory service may 710 wait for the next command.

Figure 8:
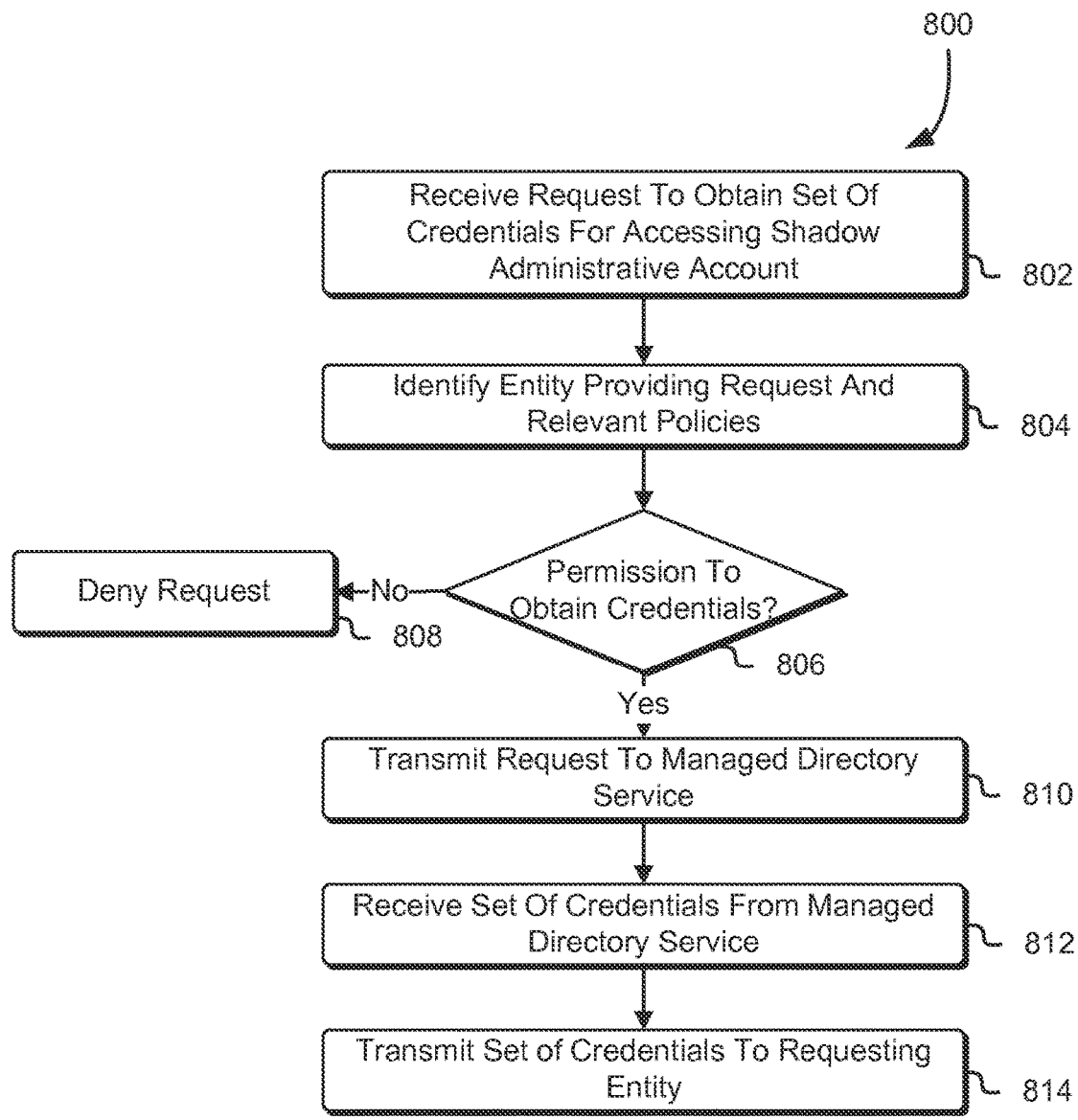
FIG. 8 is an illustrative example of a process for transmitting a set of credentials for accessing a shadow administrative account to a requesting entity in accordance with at one embodiment.

As noted above, once the managed directory service has created an identity pool in response to a request from a customer or delegated user, the managed directory service may generate a shadow administrator account and enable the customer to utilize a newly exposed appropriately configured API call (e.g., "GetDirectoryToken( )" as illustrated in FIG. 1) to allow the customer or delegated user to request a set of credentials to access the shadow administrator account. The identity management service within a computing resource service provider may enable the customer and delegated users to utilize this API call to obtain this set of credentials from the managed directory service. Accordingly, FIG. 8 is an illustrative example of a process 800 transmitting a set of credentials for accessing a shadow administrative account to a requesting entity in accordance with at one embodiment. The process 800 may be performed by an identity management service configured to identify one or more policies applicable to a requesting entity and communicate with a managed directory service to transmit requests and receive the set of credentials.

Upon creation of the identity pool within the managed directory service, the cross-premises directory service may enable a customer or delegated to utilize a newly exposed appropriately configured API call to request a set of credentials for accessing a shadow administrator account within this identity pool. Accordingly, a customer or delegated user may access the computing resource service provider and, through an interface provided by the computing resource service provider, transmit a request to obtain this set of credentials. The customer may transmit this request through the newly exposed appropriately configured API call to the managed directory service through the computing resource service provider. Accordingly, the identity management service within the computing resource service provider may receive 802 this request. As will be described below, the identity management service may be configured to either deliver the request to the managed directory service or deny the request dependent upon the identification of the user making the request and the infrastructure policies applicable to this user.

Once the identity management service has received the request to obtain the set of credentials for accessing the shadow administrative account, the identity management service may identify 804 the entity providing the request and any infrastructure policies applicable to this entity. As noted above, a customer may operate and maintain one or more directories within a managed directory service, as well as the newly created identity pool. The customer may delegate its authority to perform certain tasks within the managed directory service to a number of delegated users by defining one or more infrastructure policies within the identity management service. For instance, the customer may specify that all delegated users may utilize the newly exposed appropriately configured API call to obtain a set of credentials to access the shadow administrator account. While infrastructure policies defining the use of an API call to access a shadow administrator account is used extensively throughout the present disclosure, customers of a computing resource service provider may define myriad policies for one or more delegated users. For instance, a customer may define one or more user policies defining a level of access to one or more services provided by the computing resource service provider.

Based at least in part on the identity of the entity providing the request and the applicable infrastructure policies for this entity, the identity management service may determine 806 whether the entity has the requisite permission to submit the request to obtain the set of credentials. If a policy includes a statement that the entity is not permitted to submit this request, the identity management service may deny 808 the request from the entity. However, if the entity is permitted to submit the request and accordingly obtain the set of credentials necessary to access the shadow administrator account, the identity management service may transmit 810 the request from the entity to the managed directory service.

As noted above, once the managed directory service receives the request to obtain the set of credentials necessary to access the shadow administrator account, the managed directory service may transmit the set of credentials to the computing resource service provider and, by extension, the customer or delegated user who submitted the request. Accordingly, the identity management service may receive 812 the set of credentials from the managed directory service and prepare these for delivery to the requesting entity. The identity management service may be configured to transmit 814 one or more appropriately configured API calls to a computing resource service provider interface to make the set of credentials available to the entity. Thus, the requesting entity, be it the customer or a delegated user, may be able to obtain the set of credentials that may be required to access the shadow administrator account and proceed to manage one or more users and/or applications within a directory within the managed directory service.

Figure 9:
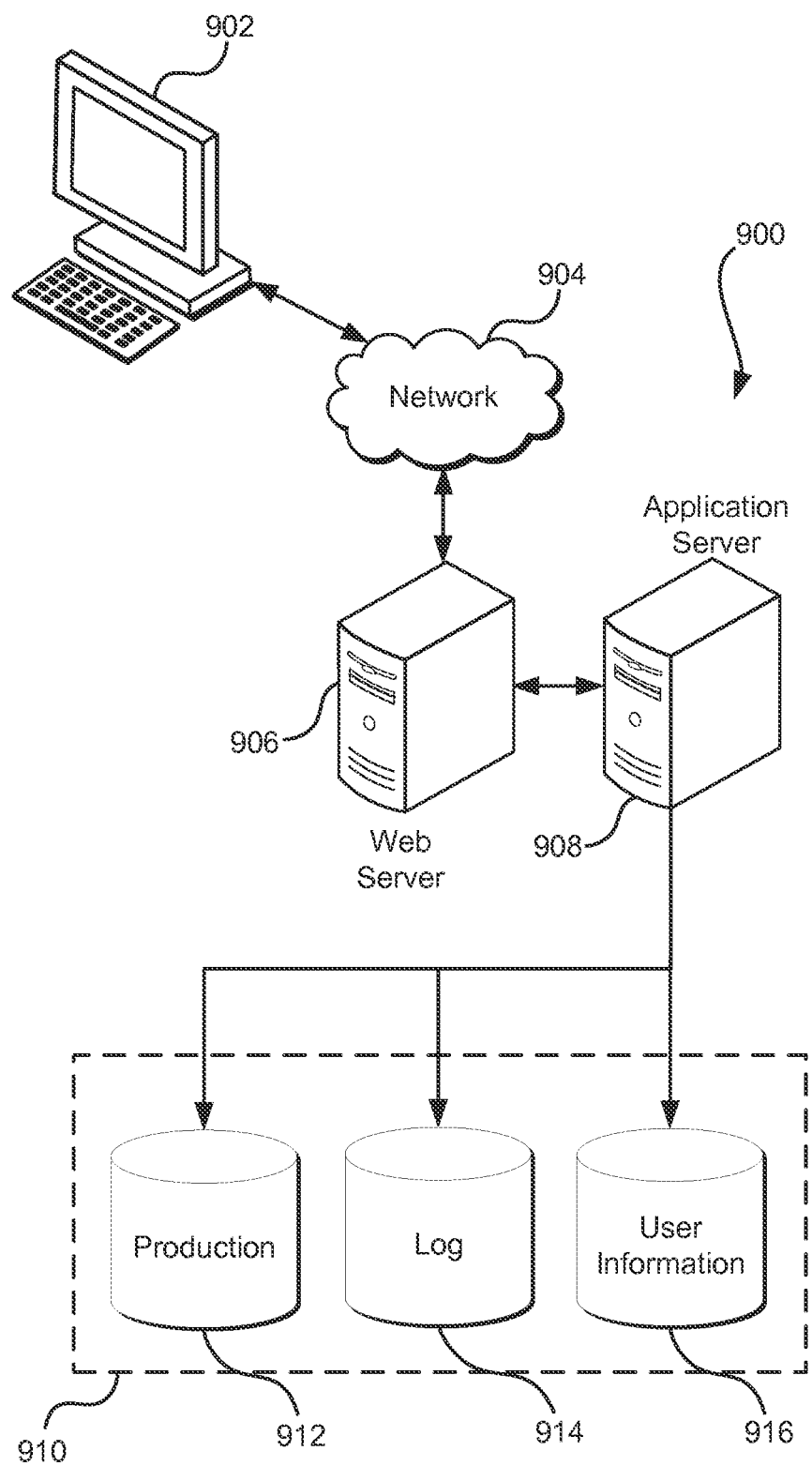
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method,
comprising: under the control of one or more computer systems configured with executable instructions,
enabling a user to utilize a set of credentials to access an interface provided by a computing resource service provider to access a managed directory service;
receiving, at the computing resource service provider, a request from the user to create an identity pool within the managed directory service of the computing resource service provider, the first request comprising information based at least in part on the set of credentials and the identity pool comprising user profiles of one or more other users of the managed directory service and directory policies defining, for each user of the one or more other users, a level of access to a directory within the managed directory service and to applications managed in the directory;
creating, at the managed directory service, the identity pool and a shadow administrative account within the identity pool, the shadow administrative account usable for managing the user profiles of the one or more other users of the managed directory service and the directory policies for defining the level of access to the directory and to the applications managed in the directory for individual users of the directory;
transmitting, through the computing resource service provider and to the managed directory service, an application programming interface command from the user to obtain a directory token for accessing the shadow administrative account, the application programming interface command made available to the user by the managed directory service;
receiving the directory token from the managed directory service; and
enabling the user to utilize the received directory token to perform actions within
the directory.

2. The computer-implemented method of claim 1, wherein the shadow administrative account is further usable to manage access to one or more resources in the directory within the managed directory service.

3. The computer-implemented method of claim 1, wherein enabling the user to utilize the set of credentials to access the interface provided by the computing resource service provider to access the managed directory service is contingent on verifying, at an identity management service provided by the computing resource service provider, that the user is authorized to access the managed directory service.

4. The computer-implemented method of claim 1, wherein the user can delegate access to the managed directory service to other users by defining, at an identity management service provided by the computing resource service provider, one or more policies for the other users.

5. The computer-implemented method of claim 1, wherein the user is a principal within an identity management service identity pool, the identity management service identity pool usable for managing access to one or more services of the computing resource service provider.

6. The computer-implemented method of claim 1, further comprising, in response to creation of the identity pool and the shadow administrator account, enabling the application programming interface command to become usable by the user within the computing resource service provider to cause the managed directory service to transmit the directory token to the user.

7. A computer system,
comprising: one or more processors; and
memory having collectively stored therein instructions that, when executed by the computer system, cause the computer system to:
authenticate a requestor utilizing credential information for accessing one or more services provided by a computing resource service provider;
receive, from the requestor, a request to create an identity pool within a managed directory service provided by the computing resource service provider, the access to the managed directory service based at least in part on the credential information and the identity pool comprising user accounts of one or more users of the managed directory service and directory policies defining, for each user of the one or more users, a level of access to a directory within the managed directory service and to applications managed in the directory;
create the identity pool within the managed directory service and an account usable by the requestor within the created identity pool, the account usable for managing user profiles of the one or more users and the directory policies; and
enable the requestor to access, by transmitting an application programming interface command to the computer system, the account from within the managed directory service, the application programming interface command made available to the user by the managed directory service.

8. The computer system of claim 7, wherein the creation of the identity pool and the account results in the managed directory service making the application programming interface command callable to cause requests to be transmitted to the managed directory service to obtain directory credential information for accessing the account from within the managed directory service.

9. The computer system of claim 8, wherein to enable the requestor to access the account includes to: transmit, through the computing resource service provider and to the managed directory service, the application programming interface command from the requestor to obtain directory credential information for accessing the account; receive the directory credential information from the managed directory service; and provide the received directory credential information to the requestor.

10. The computer system of claim 7, wherein the requestor is a principal within an identity management service identity pool, the identity management service identity pool usable for managing access to the one or more services provided by the computing resource service provider.

11. The computer system of claim 10, wherein the requestor can delegate access to the managed directory service to other users by defining one or more policies for the other users within the identity management service.

12. The computer system of claim 7, wherein the account is usable to manage access to one or more resources in a directory within the managed directory service.

13. The computer system of claim 12, wherein the one or more resources in the directory include one or more groups of the managed directory service, one or more policies and the applications managed in the directory.

14. A non-transitory computer-readable storage medium having collectively stored thereon executable instructions that, when executed by one or more processors of a computer system, cause the computer system to at least:
- verify a requestor utilizing credential information to access one or more services provided by a computing resource service provider is authorized to access a managed directory service provided by the computing resource service provider;
- receive, from the requestor, a request to create an identity pool within the managed directory service, the identity pool usable to manage user accounts of one or more users of the managed directory service and directory policies defining, for each user of the one or more users, a level of access to a directory within the managed directory service and to applications managed in the directory;
- create the identity pool within the managed directory service and an account usable by the requestor within the created identity pool, the account usable for managing user profiles of the one or more users of the managed directory service and the directory policies; and
- enable the requestor to access, by transmitting an application programming interface command to the computer system, the account from within the managed directory service, the application programming interface command made available to the user by the managed directory service.

15. The non-transitory computer-readable storage medium of claim 14, wherein the creation of the identity pool and the account results in the managed directory service making the application programming interface command callable to cause requests to be transmitted to the managed directory service to obtain directory credential information for accessing the account from within the managed directory service.

16. The non-transitory computer-readable storage medium of claim 15, wherein to enable the requestor to access the account includes to:
- transmit, through the computing resource service provider and to the managed directory service, the application programming interface command from the requestor to obtain directory credential information for accessing the account;
- receive the directory credential information from the managed directory service; and
- provide the received directory credential information to the requestor.

17. The non-transitory computer-readable storage medium of claim 14, wherein the requestor is a principal within an identity management service identity pool, the identity management service identity pool usable for managing access to the one or more services provided by the computing resource service provider.

18. The non-transitory computer-readable storage medium of claim 17, wherein the requestor can delegate access to the managed directory service to other users by defining one or more policies for the other users within the identity management service.

19. The non-transitory computer-readable storage medium of claim 14, wherein the account is usable to manage access to one or more resources of the directory within the managed directory service.

20. The non-transitory computer-readable storage medium of claim 19, wherein the one or more resources include one or more groups of the managed directory service, one or more policies, and the applications managed in the directory.

* * * * *